(12) United States Patent
Lee et al.

(10) Patent No.: US 8,918,131 B2
(45) Date of Patent: Dec. 23, 2014

(54) APPARATUS AND METHOD FOR TRANSMITTING DATA AND APPARATUS AND METHOD FOR RECEIVING DATA OF MULTI-CARRIER COMMUNICATION SYSTEM

(75) Inventors: Sook Jin Lee, Daejeon (KR); Kyung Soo Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 488 days.

(21) Appl. No.: 13/062,079

(22) PCT Filed: Sep. 4, 2009

(86) PCT No.: PCT/KR2009/005017
§ 371 (c)(1),
(2), (4) Date: Mar. 3, 2011

(87) PCT Pub. No.: WO2010/027216
PCT Pub. Date: Mar. 11, 2010

(65) Prior Publication Data
US 2011/0165904 A1    Jul. 7, 2011

(30) Foreign Application Priority Data

Sep. 5, 2008 (KR) .......... 10-2008-0087923
Aug. 5, 2009 (KR) .......... 10-2009-0072138

(51) Int. Cl.
*H04B 7/00* (2006.01)
*H04W 72/06* (2009.01)

(52) U.S. Cl.
CPC .................. *H04W 72/06* (2013.01)
USPC .................. 455/509; 455/73; 370/342

(58) Field of Classification Search
CPC .................. H04W 72/06
USPC .................. 455/73, 509
See application file for complete search history.

(56) References Cited

U.S. PATENT DOCUMENTS

| | | | |
|---|---|---|---|
| 7,411,930 B2 | 8/2008 | Montojo et al. | |
| 7,912,425 B2 * | 3/2011 | Ihm et al. .......... | 455/39 |
| 8,005,479 B2 | 8/2011 | Meiyappan | |
| 2003/0135632 A1 * | 7/2003 | Vrzic et al. .......... | 709/231 |
| 2005/0135312 A1 * | 6/2005 | Montojo et al. .......... | 370/335 |
| 2007/0218913 A1 * | 9/2007 | Chen .......... | 455/450 |
| 2008/0219219 A1 * | 9/2008 | Sartori et al. .......... | 370/335 |
| 2008/0242340 A1 | 10/2008 | Kang et al. | |
| 2009/0116468 A1 * | 5/2009 | Zhang et al. .......... | 370/342 |
| 2009/0141678 A1 * | 6/2009 | Sun et al. .......... | 370/329 |
| 2013/0064171 A1 * | 3/2013 | Zhang et al. .......... | 370/315 |

FOREIGN PATENT DOCUMENTS

| | | |
|---|---|---|
| KR | 10-2006-0055433 A | 5/2006 |
| KR | 10-2006-0121937 A | 11/2006 |
| KR | 10-2008-0087370 A | 10/2008 |
| KR | 10-2008-0087611 A | 10/2008 |
| WO | 2005/062492 A1 | 7/2005 |

* cited by examiner

*Primary Examiner* — David Bilodeau
(74) *Attorney, Agent, or Firm* — Jefferson IP Law, LLP

(57) ABSTRACT

An apparatus for transmitting data in a communication system supporting multi-carriers determines the priority of the multi-carriers and transmits information on the priority to a terminal. Thereafter, the transmitting apparatus allocates data to the multi-carriers in accordance with the priority and transmits the allocated data to a data receiving apparatus, and the data receiving apparatus receives data to be transmitted from the data transmitting apparatus in accordance with information on the priority.

20 Claims, 4 Drawing Sheets

| FAID | Priority |
|------|----------|
| 0 | 1 |
| 1 | 4 |
| 2 | 3 |
| 3 | 2 |

APPARATUS AND METHOD FOR TRANSMITTING DATA AND APPARATUS AND METHOD FOR RECEIVING DATA OF MULTI-CARRIER COMMUNICATION SYSTEM

TECHNICAL FIELD

The present invention relates to an apparatus and a method for transmitting data and an apparatus and a method for receiving data of multi-carrier communication system.

BACKGROUND ART

A communication system supports a multi-carrier for extending transmission capacity.

In the multi-carrier, a non-arrangement phenomenon of a protocol data unit (PDU) that does not occur in a single-carrier may occur. The PDU should be re-arranged in order to solve the non-arrangement phenomenon. However, in order to re-arrange the PDU, a sequence number (SN) should be inserted into all the PDUs, thereby wasting wireless resources.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide an apparatus and a method for managing a multi-carrier having an advantage of remedying a waste of wireless resources.

Solution to Problem

A first embodiment of the present invention provides a method for transmitting data to a terminal in a base station of a communication system supporting multi-carriers. The method for transmitting data includes: determining a priority of the multi-carriers; transmitting information on the priority to the terminal; and allocating the data to at least one carrier of the multi-carriers in accordance with the priority and transmitting the data to the terminal.

A second embodiment of the present invention provides a method for receiving data in a terminal of a communication system supporting multi-carriers. The data receiving method includes: receiving information on a priority of the multi-carriers from a base station; receiving data transmitted through the multi-carriers; and arranging the received data in accordance with the information on the priority.

A third embodiment of the present invention provides an apparatus for receiving data in a communication system supporting multi-carriers. The data receiving apparatus includes: a physical layer processor that receives data transmitted through the multi-carriers from a base station; and a medium access control layer processor that arranges the received data in accordance with the priority of the multi-carriers. The physical layer processor receives the information on the priority of the multi-carriers from the base station in call connection. In addition, the medium access control layer processor arranges the received data in accordance with a priority of the multi-carriers.

A fourth embodiment of the present invention provides an apparatus for transmitting data in a communication system supporting multi-carriers. The data transmitting apparatus includes a priority determiner, a data allocator, and a transmitter. The priority determiner determines a priority of the multi-carriers. The data allocator allocates the data to the multi-carriers in accordance with the priority. The transmitter transmits information on the priority to the terminal in call connection and transmits the data to the terminal through the multi-carriers.

Advantageous Effects of Invention

According to an embodiment of the present invention, in a communication system that supports a multi-carrier, since a base station transmits information on transmission priority of the multi-carrier to a terminal in call connection of the terminal to the terminal, a sequence number (SN) may not be inserted into all data at the time of re-arranging the data, thereby remedying a waste phenomenon of wireless resources.

Further, whether or not the data is allocated to the multi-carrier can be expressed by a bitmap at the time of configuring a downlink map information component in a downlink map (DL MAP) message, thereby increasing an allocation amount of the wireless resources for the data.

MODE FOR THE INVENTION

Figure 1:
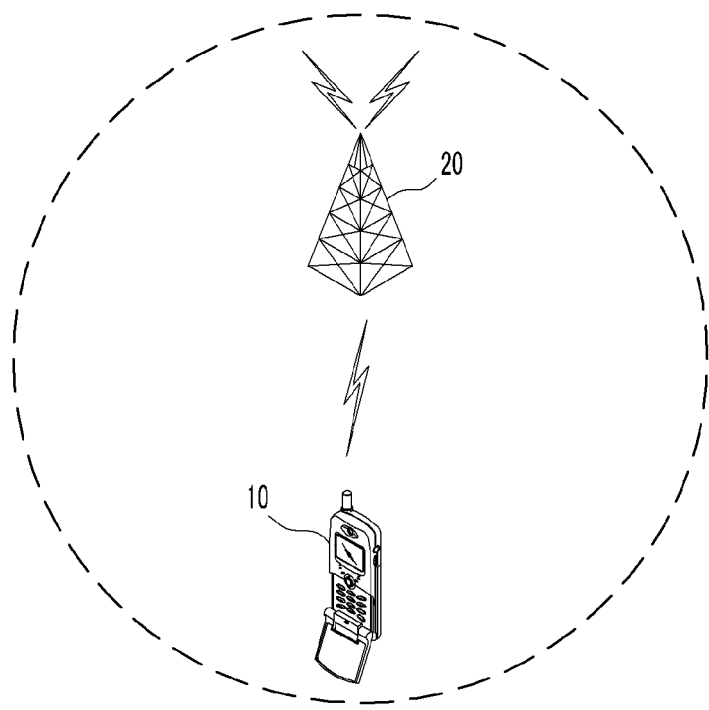
FIG. 1 is a schematic diagram illustrating a wireless communication system that supports a multi-carrier according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and the appended claims, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber station, the user equipment, the access terminal, etc.

In the specification, a base station (BS) may designate an access point (AP), a radio access station (RAS), a node B, an evolved node B (eNodeB), a base transceiver station (BTS), a mobile multihop relay (MMR)-BS, etc., and may include the entire or partial functions of the access point, the radio access station, the node B, the evolved node B, the base transceiver station, the MMR-BS, etc.

Hereinafter, an apparatus and a method for transmitting data and a method and an apparatus for receiving data of a multi-carrier communication system according to an embodiment of the present invention will be described in detail with reference to the accompanying drawings.

Figure 2:
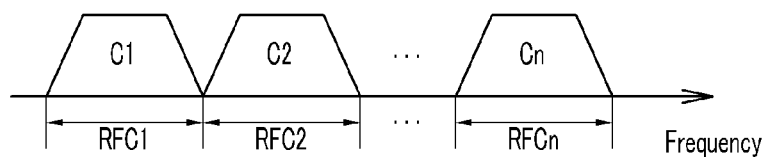
FIG. 2 is a diagram illustrating a multi-carrier.

FIG. 1 is a schematic diagram illustrating a wireless communication system that supports a multi-carrier according to an embodiment of the present invention, and FIG. 2 is a diagram illustrating a multi-carrier.

Referring to FIG. 1, the wireless communication system that supports the multi-carrier includes a terminal 10 and a base station 20.

The terminal 10, as an end point of a wireless channel, supports multi-carriers F0 to Fn having frequency bands RFC1 to RFCn, as shown in FIG. 2. Therefore, the terminal 10 communicates with the base station 20 by using the multi-carriers F0 to Fn having the frequency bands RFC1 to RFCn.

One carrier of the multi-carriers F0 to Fn is set as a primary carrier and the remaining carriers are set as secondary carriers. The primary carrier is a carrier for transmitting and receiving various control information and data between the terminal 10 and the base station 20, and the subcarrier is an additional subcarrier used for transmitting and receiving the data in a state in which the terminal 10 transmits and receives the control information through the primary carrier.

The terminal 10 receives priority information of the multi-carriers F0 to Fn from the base station 20 in call connection. Thereafter, when the terminal 10 receives the data from the base station 20, the terminal 10 receives data of each of the multi-carriers F0 to Fn in accordance with the priority information of the multi-carriers F0 to Fn.

The base station 20 communicates with the terminal 10 that is positioned in a cell area, and manages the multi-carriers F0 to Fn that are supported by the terminal 10. The base station 20 determines the priority of the multi-carriers F0 to Fn that are supported by the terminal 10 in the call connection, and notifies the priority information of the multi-carriers F0 to Fn to the terminal 10. Thereafter, the base station 20 transmits the data to the terminal through each of the carriers F0 to Fn by allocating the data to each of the carriers F0 to Fn in accordance with the priority of the multi-carriers F0 to Fn when data to be transmitted to the terminal is present.

Figure 3:
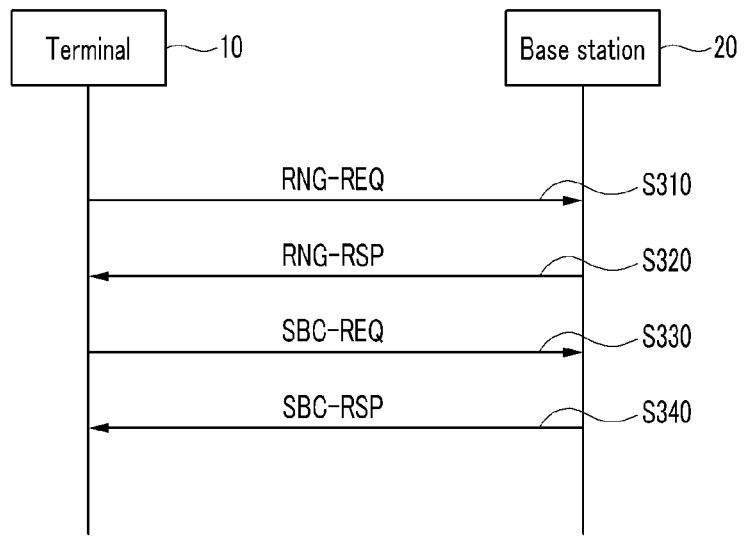
FIG. 3 is a diagram illustrating a method in which a base station notifies information on a priority of a multi-carrier to a terminal according to an embodiment of the present invention.
Figures 4, 6:
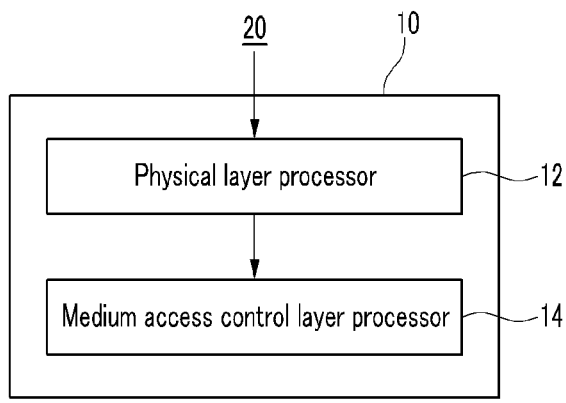
FIG. 4 is a diagram illustrating information on a priority in an SBC-REQ message.
FIG. 6 is a diagram illustrating a terminal according to an embodiment of the present invention.

FIG. 3 is a diagram illustrating a method in which a base station notifies information on a priority of a multi-carrier to a terminal according to an embodiment of the present invention, and FIG. 4 is a diagram illustrating information on a priority in an SBC-REQ message.

Referring to FIG. 3, the terminal 10 transmits a ranging request (RNG-REQ) message including an indicator that indicates whether or not the terminal 10 itself is the terminal that supports the multi-carriers to the base station 20.

The base station 20 transmits a ranging response (RNG-RSP) message including information of the multi-carriers that the terminal 10 can use in response to the RNG-REQ message to the terminal 10.

The terminal 10 that receives the RNG-RSP message sets one carrier of the multi-carriers that are usable by the terminal 10 as the primary carrier, and sets the remaining carriers as secondary carriers. Thereafter, the terminal 10 transmits a subscriber station's basic capability negotiation request (SBC-REQ) message including information of the primary carrier and the secondary carrier to the base station 20. The SBC-REQ is a medium access control (MAC) message that the terminal 10 transmits to negotiate a basic capability with the base station 20. The SBC-REQ includes information on modulation and coding that can be supported by the terminal 10.

When the base station 20 receives the information on the primary carrier and the secondary carrier from the terminal 10 through the SBC-REQ message, the base station 20 determines the priority of the multi-carriers.

The base station 20 transmits the subscriber station's basic capability negotiation response (SBC-RSP) message including the priority of the multi-carriers determined in response to the SBC-REQ message to the terminal 10. At this time, as shown in FIG. 4, the priority of the multi-carriers depending on an identifier (FAID) of each carrier of the multi-carriers may be included in the SBC-RSP message in the form of a table. In FIG. 4, the carriers have higher priorities in the order of the carriers having identifiers (FAID) of "0", "3, "2", and "1".

The terminal 10 sequentially receives the data of each carrier transmitted by the base station 20 on the basis of the information on the priority of the multi-carriers, and arranges the received data and transmits it to an upper layer.

As such, the base station 20 according to the embodiment of the present invention transmits the priority of the multi-carriers to the terminal 10 by using the messages transmitted and received between the terminal 10 and the base station 20 in the call connection.

Figure 5:
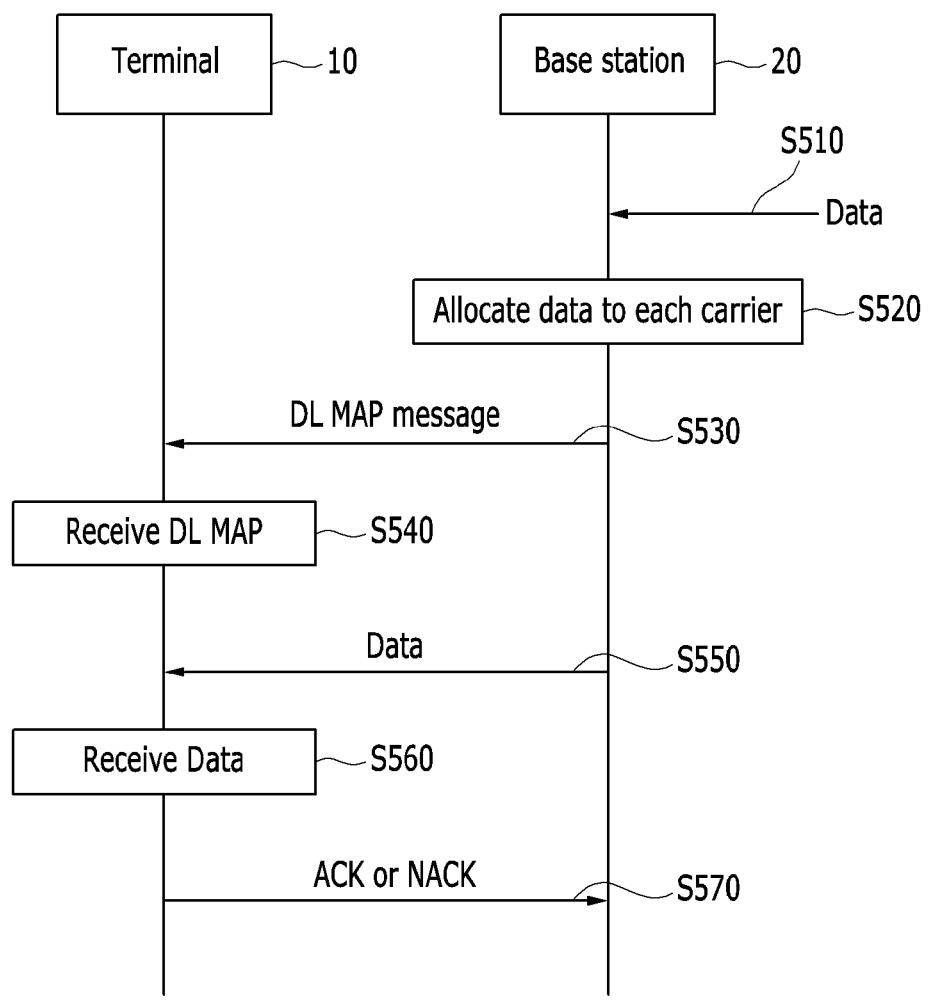
FIG. 5 is a diagram illustrating a method for transmitting data in a base station according to an embodiment of the present invention.

FIG. 5 is a diagram illustrating a method for transmitting data in a base station according to an embodiment of the present invention.

Referring to FIG. 5, when data to be transmitted to a terminal 10 is generated (S510), the base station 20 allocates the data to at least one carrier of multi-carriers F0 to Fn in accordance with the priority of the multi-carriers (S520), and transmits resource allocation information that is included in a downlink map (DL MAP) message to the terminal 10 through a primary carrier (S530). The resource allocation information includes information on a carrier to which the data is allocated. Contrary to this, the downlink map (DL MAP) message can be transmitted to the terminal 10 even through the primary carrier and secondary carriers.

More specifically, as shown in Table 1, a base station 20 sets a bitmap (MC bitmap) indicating whether or not data is allocated to each of multi-carriers at the time of configuring a downlink map information element (DL_MAP_IE) in a downlink map (DL MAP) message, and expresses whether or not the data is allocated to each carrier in the bitmap in a bit. At this time, the carrier allocated with the data is expressed as "1" and the carrier unallocated with the data is expressed as "0", and the carriers may be expressed in the reverse manner. For example, in the case in which the number (N_MC) of multi-carriers is 4, when the data is allocated to first and third carriers, the bitmap (MC bitmap) can be set as "1010".

TABLE 1

| Syntax | Contents |
| --- | --- |
| DL_MAP_IE( ) { | |
| ... | |
| CID | Connection identifier |

TABLE 1-continued

| Syntax | Contents |
| --- | --- |
| N_MC | Number of multi-carriers |
| MC bitMap | Multi-carrier bitmap |
| ... | |
| } | |

The base station 20 transmits the data through each carrier (S540).

The terminal 10 sequentially receive the data in accordance with the priority of the multi-carriers in the corresponding carrier by using the resource allocation information after receiving the downlink map (DL MAP) message (S550 to S560). At this time, when the downlink map (DL MAP) message is transmitted through the primary carrier and the secondary carriers, the terminal 10 can receive and process the downlink map (DL MAP) message in accordance with the priority of the multi-carriers.

Thereafter, when the terminal 10 succeeds in receiving the data, the terminal 10 transmits an acknowledge response (ACK) to the base station 20, and when the terminal 10 fails in receiving the data, the terminal 10 transmits a non-acknowledge response (NACK) to the base station 20 (S570).

FIG. 6 is a diagram illustrating a terminal according to an embodiment of the present invention.

Referring to FIG. 6, a data receiving apparatus of the terminal 10 includes a physical layer processor 12 and a medium access control layer processor 14.

The physical layer processor 12 receives the SBC-RSP message from the base station 20 in call connection, and acquires information on the priority of the multi-carriers from the SBC-RSP message.

Further, when the base station 20 transmits the downlink map (DL MAP) message, the physical layer processor 12 receives the downlink map (DL MAP) message to acquire information on the carrier allocated with the data. Thereafter, when the base station 20 transmits the data, the physical layer processor 12 sequentially receives the data in the corresponding carrier in accordance with the priority of the multi-carriers on the basis of the information on the carrier allocated with the data, and stores the received data in each carrier buffer (not shown). Further, the physical layer processor 14 sequentially transmits the data stored in each carrier buffer (not shown) to the medium access control layer processor 14 in accordance with the priority of the multi-carriers.

The medium access control layer processor 14 receives the data sequentially transmitted from the physical layer processor 12, and arranges the received data and transmits the data to an upper layer.

Figure 7:
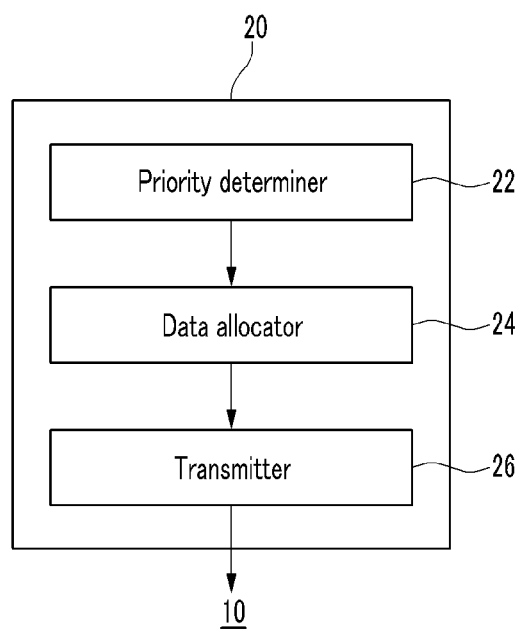
FIG. 7 is a diagram illustrating a base station according to an embodiment of the present invention.

FIG. 7 is a diagram illustrating a base station according to an embodiment of the present invention.

Referring to FIG. 7, a data transmitting apparatus of the base station 20 includes a priority determiner 22, a data allocator 24, and a transmitter 26.

After the priority determiner 22 receives the SBC-REQ message from the terminal 10, the priority determiner 22 determines the priority of the multi-carriers supported by the terminal 10. The terminal 10 measures channel quality information of each carrier, and reports the channel quality information of each carrier to the base station 20 at a predetermined cycle. The channel quality information may include a received signal strength indicator (RSSI) or a carrier to interface ratio (CINR). Accordingly, the priority determiner 22 can determine the priority of the multi-carriers through the channel quality information of the multi-carriers, which is reported from the terminal 10. Further, the priority determiner 22 may determine the priority of the multi-carriers by using a different method from the above-mentioned method.

When data to be transmitted to the terminal 10 is present, the data allocator 24 allocates the data to the corresponding carrier in accordance with the priority of the multi-carriers, and sets whether the data is allocated to each carrier of the multi-carriers in the downlink map (DL MAP) message.

The transmitter 26 transmits the downlink map (DL MAP) message through the primary carrier and transmits the data to the terminal 10 through the corresponding carrier. Further, the transmitter 26 transmits the information on the priority of the multi-carriers and the information on the carrier allocated with the data to the terminal 10.

The above-mentioned exemplary embodiments of the present invention are not embodied only by a apparatus and/or method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for transmitting data to a terminal in a base station of a communication system supporting multi-carriers, comprising:

determining a priority of the multi-carriers that is used as an alignment order of a receiving data by the terminal;

transmitting information on the priority to the terminal; and allocating the data to at least one carrier of the multi-carriers in accordance with the priority and transmitting the data to the terminal, wherein the terminal sequentially aligns the received data through the multi-carriers according to the information on the priority of the multi-carriers.

2. The method of claim 1, further comprising transmitting information on at least one carrier allocated with the data to the terminal before allocating and transmitting the data to the terminal.

3. The method of claim 2, wherein the information of at least one carrier is transmitted through a downlink map message.

4. The method of claim 3, wherein the downlink map message includes a downlink map information element, and the downlink map information element includes a bitmap in which whether or not the data is allocated to the multi-carriers is expressed in a bit.

5. The method of claim 1, wherein the information on the priority is transmitted through a subscriber station's basic capability negotiation response (SBC-RSP) message.

6. The method of claim 1, further comprising:

receiving an indicator indicating whether or not the terminal is a terminal that can support the multi-carriers from the terminal; and transmitting information on the multi-carriers that the terminal will use to the terminal.

7. The method of claim 6, wherein the indicator is received through a ranging request (RNG-REQ) message, and the information on the multi-carriers is transmitted through a ranging response (RNG-RSP) message.

8. A method for receiving data in a terminal of a communication system supporting multi-carriers, comprising:
   receiving information on a priority of the multi-carriers, that is used as an alignment order of a receiving data by the terminal, from a base station;
   receiving data transmitted through the multi-carriers; and
   arranging the received data in accordance with the information on the priority.

9. The method of claim 8, wherein the information on the priority is received through call connection.

10. The method of claim 9, wherein the information on the carrier is received through a downlink map message.

11. An apparatus for receiving data in a communication system supporting multi-carriers, comprising:
   a physical layer processor that receives data transmitted through the multi-carriers, that is used as an alignment order of a receiving data by the terminal, from a base station; and
   a medium access control layer processor that arranges the received data in accordance with a priority of the multi-carriers.

12. The apparatus of claim 11, wherein the physical layer processor receives the information on the priority of the multi-carriers from the base station in call connection.

13. The apparatus of claim 12, wherein the information on the priority is received through a subscriber station's basic capability negotiation response (SBC-RSP) message.

14. The apparatus of claim 11, wherein the physical layer processor receives information on a carrier allocated with the data among the multi-carriers from the base station before receiving the data.

15. The apparatus of claim 14, wherein the information on the carrier is received through a downlink map message.

16. An apparatus for transmitting data in a communication system supporting multi-carriers, comprising:
   a priority determiner that determines a priority of the multi-carriers that is used as an alignment order of a receiving data by the terminal;
   a data allocator that allocates the data to the multi-carriers in accordance with the priority; and
   a transmitter that transmits information on the priority to the terminal in call connection and transmits the data to the terminal through the multi-carriers,
   wherein the terminal sequentially aligns the received data through the multi-carriers according to the information on the priority of the multi-carriers.

17. The apparatus of claim 16, wherein the transmitter transmits information on a carrier allocated with the data among the multi-carriers to the terminal before transmitting the data to the terminal.

18. The apparatus of claim 17, wherein
   the information on the carrier is transmitted through a downlink map message.

19. The apparatus of claim 18, wherein the downlink map message includes a downlink map information element, and the downlink map information element includes a bitmap in which whether or not the data is allocated to the multi-carriers is expressed in a bit.

20. The apparatus of claim 16, wherein the priority determiner determines the priority by using channel quality information of each carrier of the multi-carriers.

* * * * *